United States Patent [19]

Kodali et al.

[11] Patent Number: 5,771,186
[45] Date of Patent: Jun. 23, 1998

[54] SYSTEM AND METHOD FOR MULTIPLYING IN A DATA PROCESSING SYSTEM

[75] Inventors: Visweswara Rao Kodali; Salim Ahmed Shah, both of Austin, Tex.

[73] Assignee: International Business Machines, Armonk, N.Y.

[21] Appl. No.: 483,768

[22] Filed: Jun. 7, 1995

[51] Int. Cl.[6] .................................................. G06F 7/52
[52] U.S. Cl. ................ 364/754.01; 364/757; 364/760.01
[58] Field of Search ..................................... 364/754, 757, 364/758, 759, 760

[56] References Cited

U.S. PATENT DOCUMENTS

| | | | |
|---|---|---|---|
| 4,202,039 | 5/1980 | Epenoy et al. ........................ | 364/757 |
| 4,208,722 | 6/1980 | Rasala et al. ........................... | 364/760 |
| 4,598,382 | 7/1986 | Sato ....................................... | 364/757 |
| 4,718,031 | 1/1988 | Nukiyama ............................. | 364/754 |
| 4,893,268 | 1/1990 | Denman, Jr. et al. ................. | 364/759 |
| 4,969,118 | 11/1990 | Montoye et al. ..................... | 364/748 |
| 5,008,850 | 4/1991 | Jensen .................................. | 364/760 |
| 5,095,456 | 3/1992 | Wong et al. .......................... | 364/757 |
| 5,220,525 | 6/1993 | Anderson et al. ..................... | 364/760 |
| 5,253,195 | 10/1993 | Broker et al. ......................... | 364/759 |
| 5,303,176 | 4/1994 | Hrusecky et al. ..................... | 364/759 |
| 5,465,226 | 11/1995 | Goto ..................................... | 364/757 |

FOREIGN PATENT DOCUMENTS 56-004839   1/1981   Japan .

*Primary Examiner*—Chuong Dinh Ngo
*Attorney, Agent, or Firm*—Kelly K. Kordzik; Winstead Sechrest & Minick P.C.; Mark E. McBurney

[57] ABSTRACT

A multiplier circuit within a CPU has its selections of partial products reordered in a unique manner so that shift left capabilities are eliminated and the hardware is required to only perform shift right operations. This allows for reduced circuit sizes in several components within the multiplier circuit in order to save area, speed computation time, and reduce power consumption on the chip.

6 Claims, 13 Drawing Sheets

SYSTEM AND METHOD FOR MULTIPLYING IN A DATA PROCESSING SYSTEM

TECHNICAL FIELD OF THE INVENTION

The present invention relates in general to data processing systems, and in particular, to a system and method for multiplying within a central processing unit in a computer system.

BACKGROUND OF THE INVENTION

A continuous goal in computer system design is to reduce the amount of area required to implement the various components of a computer system, such as the central processing unit ("CPU"). Thus, circuit designers are constantly trying to design more efficient logical circuits that require less area to implement. A goal of the present invention is to reduce the number of logic circuits found in a large multiplier, such as the 64-bit multiplier within a CPU, while at the same time maintaining an equal or improved performance.

Figure 6:
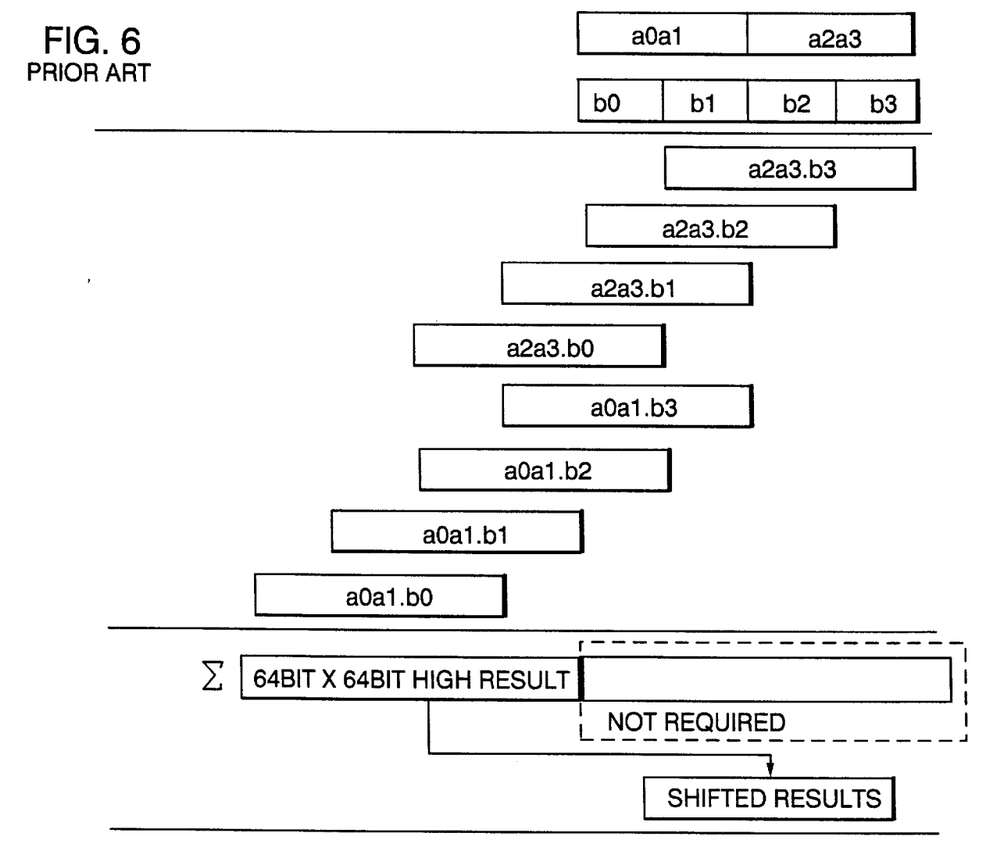
FIG. 6 (illustrates a diagram of summing of partial products in accordance with the prior art.

Within a typical multiplier hardware, partial products are summed to arrive at the final multiplication product. This requires producing partial products, a shifting operation in order to align the partial products, and producing the final sum to create the result. This is illustrated in FIG. 6 wherein two 64-bit values.(a0a1a2a3 and b0b1b2b3) are multiplied. The first value is split into two 32-bit values: a0a1 and a2a3. The second value is split into four 16-bit values: b0, b1, b2 and b3. These values are multiplied and summed in order to produce the 64-bit×64-bit HIGH result desired (the lower 64 bits of the resultant product are not required in this example).

Figure 1:
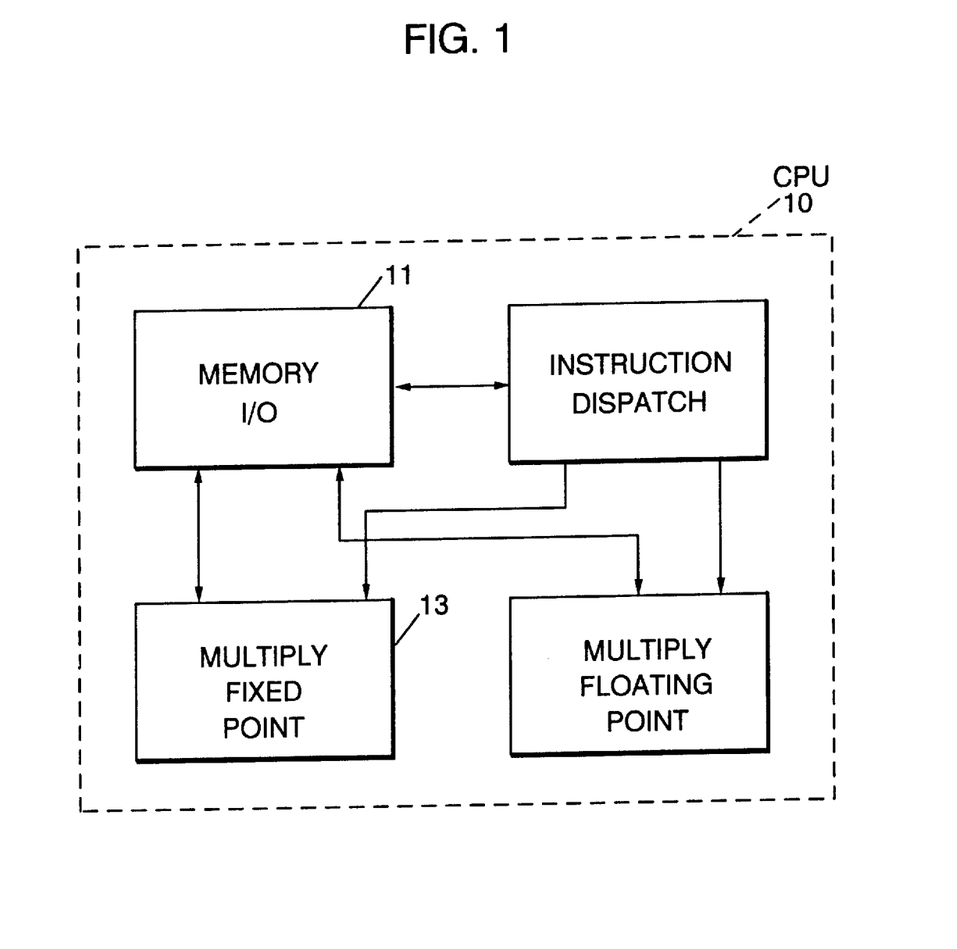
FIG. 1 illustrates a fixed point multiplier within a CPU.

Such a multiplying process may be performed within the fixed point multiplier 13 within CPU 10, such as illustrated in FIG. 1. Multiplier 13 may receive the above two values from memory I/O 11 within CPU 10, and eventually return the resultant product to memory I/O 11.

Figure 2:
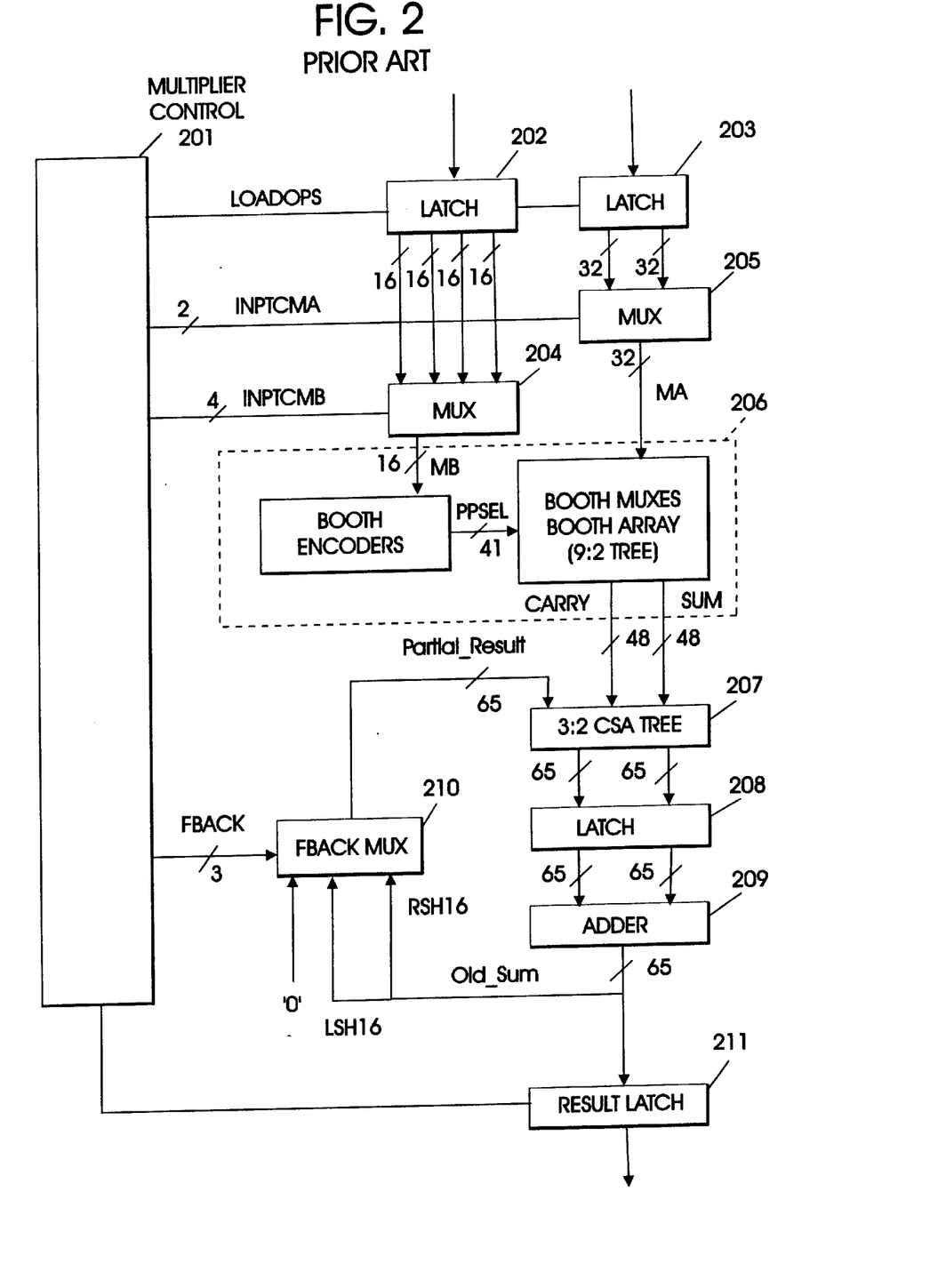
FIG. 2 illustrates a portion of a prior art fixed point multiplier.

Referring to both FIGS. 2 and 6, control logic 201 will initiate loading of the above two values from memory I/O 11 into latches 202 and 203. This is performed using the LOADOPS signal. The a0a1 and a2a3 values will be loaded into latch 203, while the b0, b1, b2 and b3 values will be loaded into latch 202. Multiplier control logic 201 will then utilize signals INPTCMA and INPTCMB to muxes 205 and 204, respectively, in order to steer ones of the above values into Booth multiplier array 206, which is well-known in the art.

First, values a2a3 and b3 are fed into Booth multiplier array 206 using muxes 205 and 204, respectively. Booth multiplier array 206 will multiply these two values, producing CARRY and SUM values that are outputted to CSA Tree 207, which is well-known in the art. The multiplication result can be obtained by adding the CARRY and SUM values. Next, control logic 201, using signal FBACK to FBACK mux 210, will first select the "0" signal to send "zero" as the PartialResult in the first cycle to tree 207. This will be combined with the CARRY and SUM from Booth multiplier array 206 to produce a 65-bit partial CARRY value and a 65-bit partial SUM value. Tree 207 is a 65-bit CSA Tree. These values are then latched through 2×65-bit register 208 to adder 209, which is a 65-bit adder.

In the next cycle, adder 209 adds these values to produce old-sum which will be a2a3.b3. The addition operation of circuits 207–209 is well-known in the art. Value a2a3.b3 is then sign extended by 16 bits and provided to mux 210 on line rsh16, which performs a right shift of 16 bits. The sign extention operation may be performed by well-known techniques. Control logic 201 will select this shifted Partial Result to provide to tree 207 for the second iteration. The lower 16 bits from adder 209 are stored away in Latch 211.

Concurrently with the add operation, control logic 207 steers into Booth multiplier array 206 values a2a3 and b2. The product obtained is partial product a2a3.b2 as CARRY and SUM signals. These values are then added to the shifted PartialResult described above with CSA tree 207. These values are stored away in latch 208.

The next iteration will add these stored away values and produce the sign extended and shifted PartialResult while the new partial product a2a3.b1 is computed. The entire process is then again repeated to arrive at another partial product a2a3.b0 and the sign extended shifted Partial Result.

The problem occurs in summation of partial product a0a1.b3 and the PartialResult. In this case, the Partial Result is formed by a shift left by 16 (lsh16) bits of the output of adder 209. Up to this point, the OldSum had to undergo a shift right operation to line up the partial products. After the shift required with respect to a0a1.b3, the multiplication process then proceeds as before until the final 64-bit×64-bit high result is obtained.

The disadvantage of the above is that CSA Tree 207 is required to be a 65-bit component, latch 208 is required to be a 2×65-bit component, and adder 209 is required to be a 65-bit adder.

What is desired is to reduce the size of these components so that higher speed and less area is required in order to implement this multiplication apparatus.

SUMMARY OF THE INVENTION

The foregoing need is solved by the present invention, which rearranges the order of summing of partial products so that a shift left capability is eliminated and the foregoing multiplication is performed with only shift right hardware. The result of this unique order is that the sizes of the CSA Tree, the latch and the adder mentioned before can be reduced from 65-bit components to 49-bit components.

The present invention reduces the hardware complexity by reducing the required circuit count and wiring count.

An embodiment of the present invention implements a method for multiplying two 64-bit numbers (a0a1a2a3 and b0b1b2b3) within a multiplier within a CPU in a data processing system in order to produce a 64-bit×64-bit High result, wherein a0a1a2a3 is divided into two 32-bit numbers: a0a1 and a2a3, and wherein b0b1b2b3 is divided into four 16-bit numbers: b0, b1, b2, b3. Instead of computing and adding the partial products in the following order: a2a3.b3, a2a3.b2, a2a3.b1, a2a3.b0, a0a1.b3, a0a1.b2, a0a1.b1, a0a1.b0, the present invention computes and adds the partial products in the following order: a2a3.b3, a2a3.b2, a2a3.b1, a0a1.b3, a0a1.b2, a2a3.b0, a0a1.b1, a0a1.b0.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now

3 made to the following descriptions taken in conjunction with the accompanying drawings, in which:

DETAILED DESCRIPTION OF A PREFERRED EMBODIMENT OF THE INVENTION

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 5:
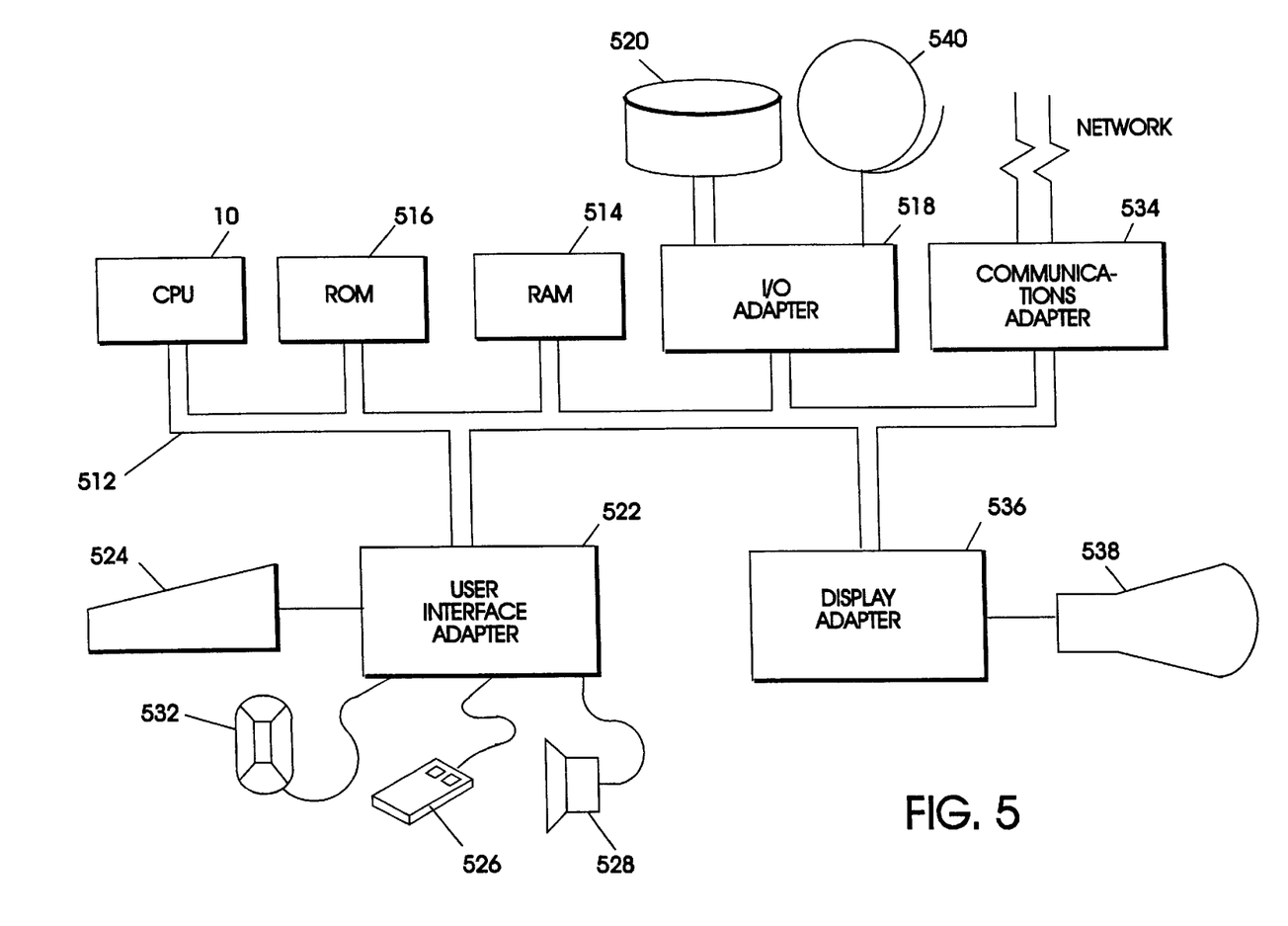
FIG. 5 illustrates a data processing system configured in accordance with the present invention.

A representative hardware environment for practicing the present invention is depicted in FIG. 5, which illustrates a typical hardware configuration of a workstation in accordance with the subject invention having central processing unit 10, such as a conventional microprocessor, and a number of other units interconnected via system bus 512. The workstation shown in FIG. 5 includes random access memory (RAM) 514, read only memory (ROM) 516, and input/output (I/O) adapter 518 for connecting peripheral devices such as disk units 520 and tape drives 540 to bus 512, user interface adapter 522 for connecting keyboard 524, mouse 526, speaker 528, microphone 532, and/or other user interface devices such as a touch screen device (not shown) to bus 512, communication adapter 534 for connecting the workstation to a data processing network, and display adapter 536 for connecting bus 512 to display device 538.

Referring again to FIG. 1, there is illustrated fixed point multiplier 13 coupled to memory I/O 11 within CPU 10. The present invention may be implemented within fixed point multiplier 13 in accordance with the following embodiment.

Figure 3:
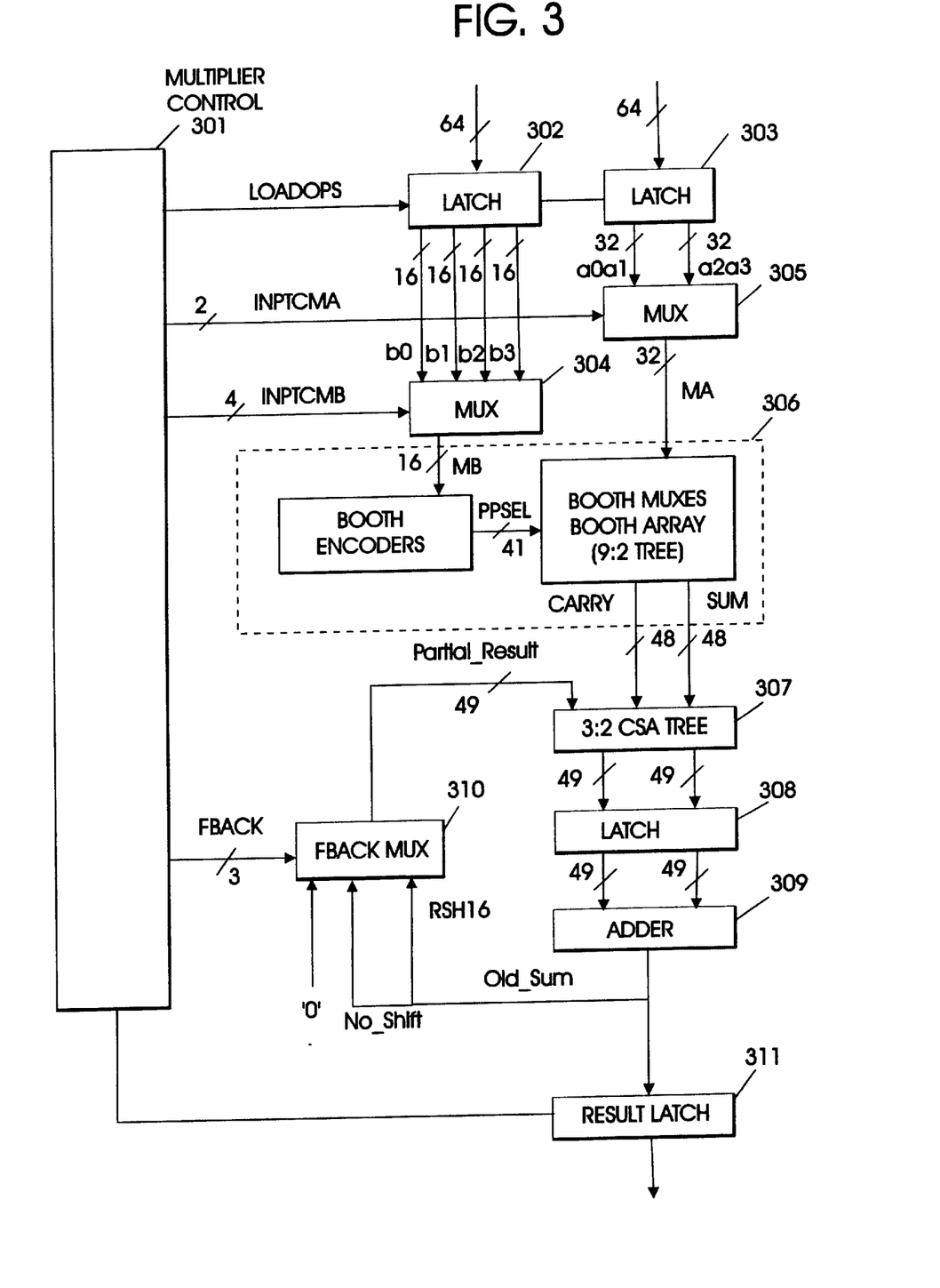
FIG. 3 illustrates a multiplier in accordance with the present invention.
Figure 7:
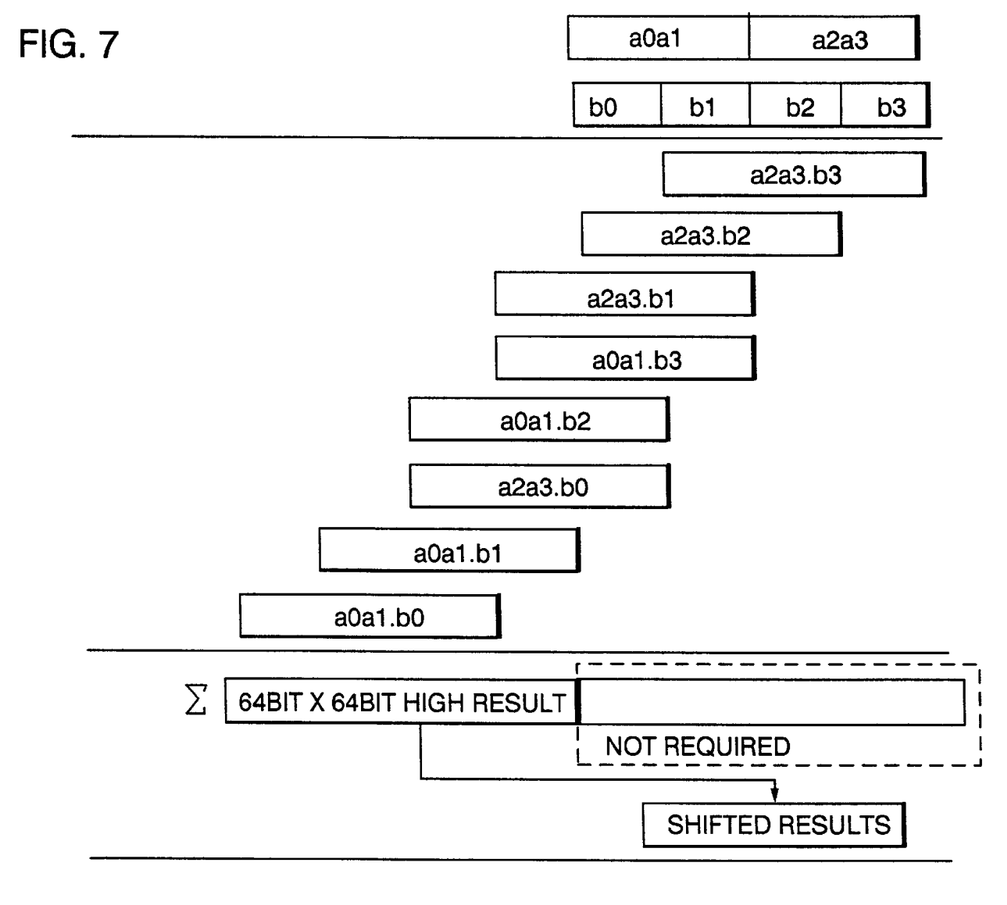
FIG. 7 illustrates the summing of partial products in accordance with the present invention.

Referring next to FIGS. 3, 4 and 7 in combination, the present invention begins at step 401 and proceeds to step 402 wherein multiplier control logic 301 loads using signal LOADOPS from memory I/O 11 the two values to be multiplied: a0a1a2a3 and b0b1b2b3. In the following example, these values are each 64-bit values. These values are loaded into latches 303 and 302, respectively. Next, in step 403, control logic 301 sends signals INPTCMA and INPTCMB to muxes 305 and 304, respectively, in order to select values a2a3 and b3 to steer into Booth multiplier array

4

Figure 4A:
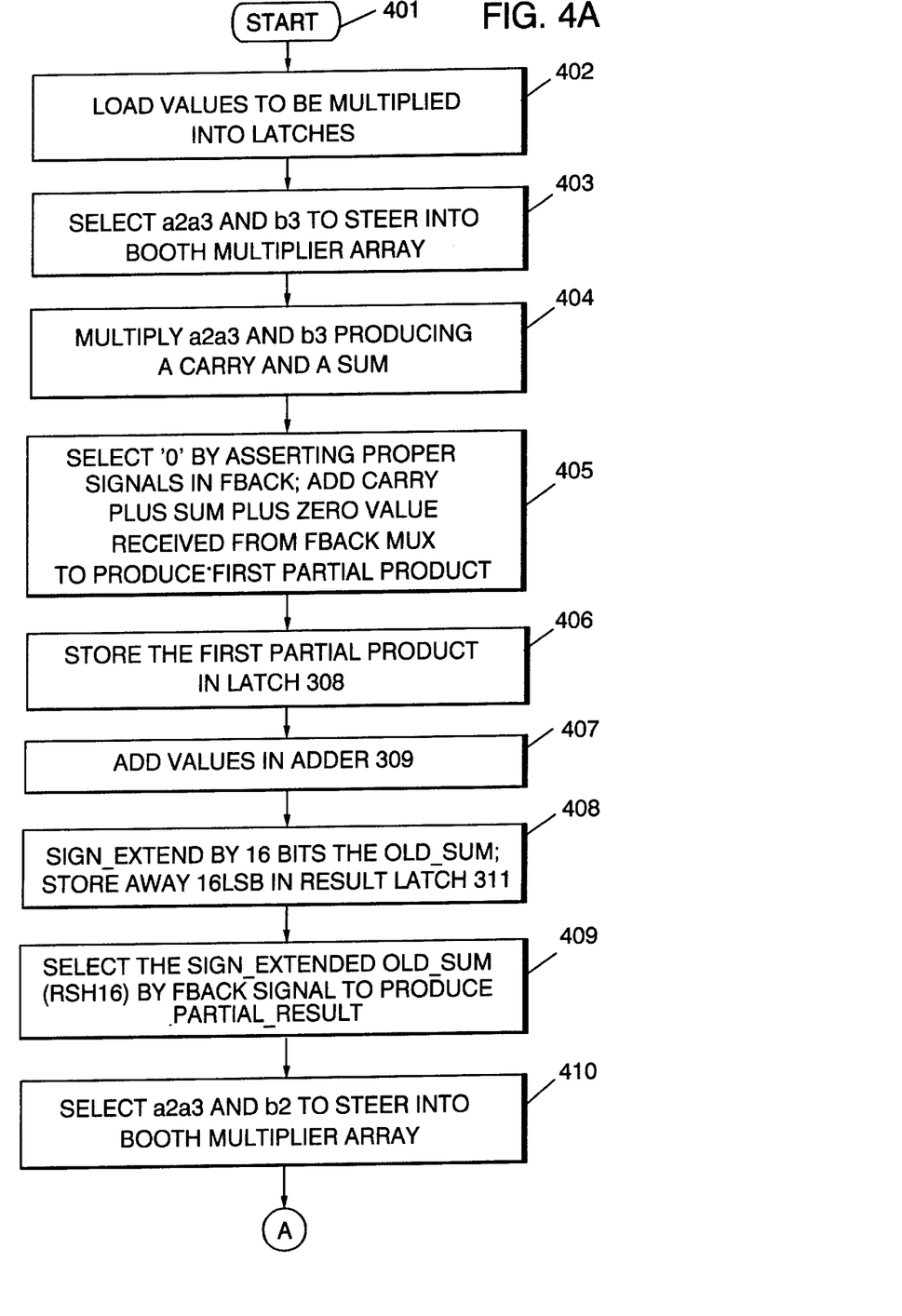
FIGS. 4A, 4B, 4C, 4D, 4E, 4F, and 4G illustrate a flow diagram of the control logic 301 shown in FIG. 3.

306. In step 404, values a2a3 and b3 are multiplied producing associated CARRY and SUM values.

In step 405, control logic 301 chooses through the transmission of signal FBACK to FBACK mux 310 the "0" value to send to CSA Tree 307 along with the CARRY and SUM values in order to arrive at 49-bit partial CARRY and partial SUM values, representing the first partial product. In step 406, this first partial product is then stored in latch 308. These values are added in adder 309 to produce the Old Sum (step 407). Tree 307 is a means to add a previously accumulated result to a current partial product as it is computed. The partial product is then latched away at the end of the cycle in latch 308. In the next cycle, these values are added by adder 309 to produce the OldSum. Note, steps 402–406 may all occur in one system cycle. In step 408, this first OldSum is then supplied by line rsh16 to FBACK mux 310 through a 16 bit signextend operation. Line rsh16 performs a right shift by 16 bits of the OldSum. The lower 16 significant bits of OldSum are stored in result latch 311.

Figure 4B:
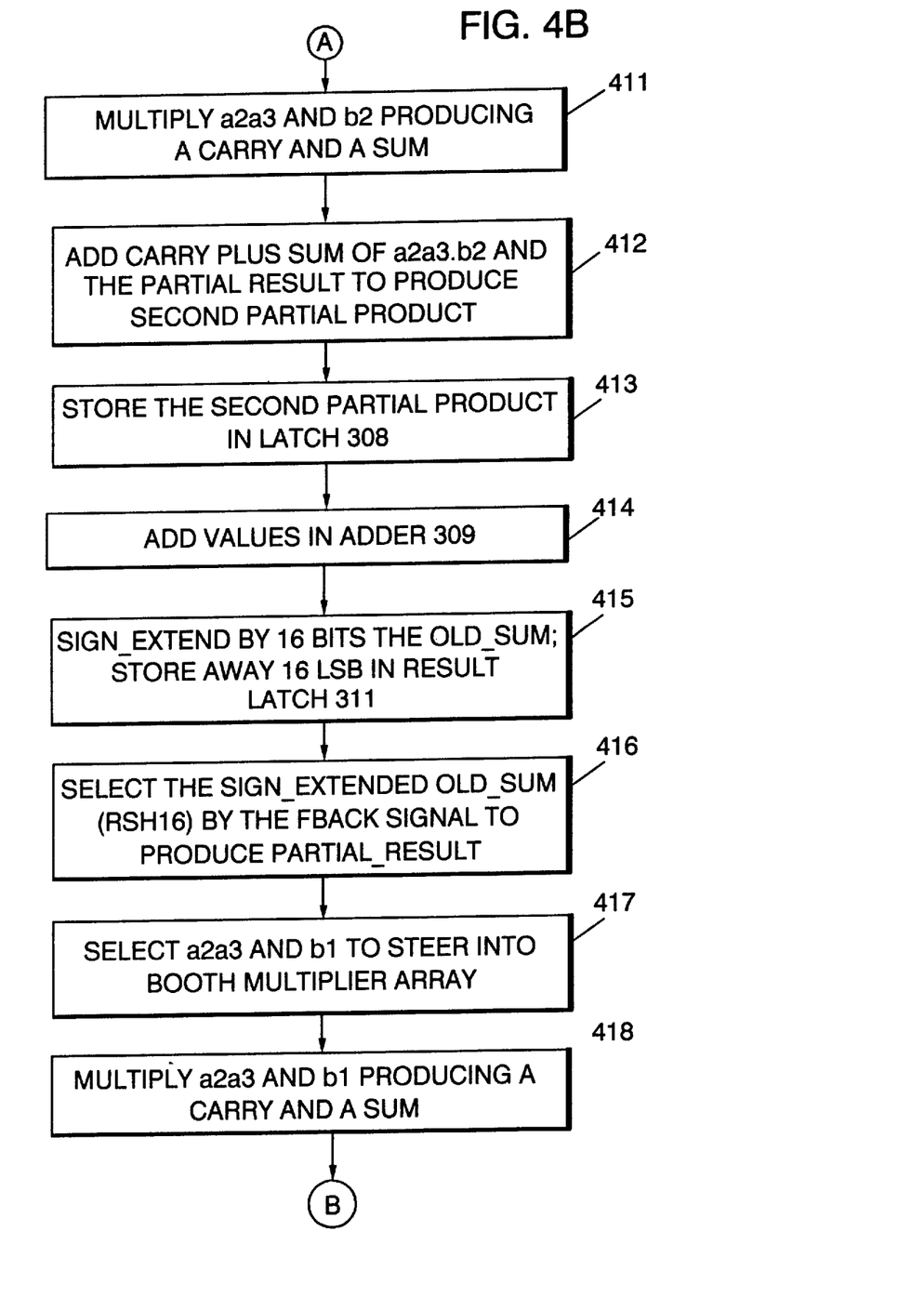

Control logic 301 will then select through mux 310 this signextended OldSum in step 409 in order to produce the PartialResult to send to tree 307. In step 410, control logic 301 selects values a2a3 and b2 to steer into Booth multiplier array 306. In step 411, these two values are multiplied to produce associated CARRY and SUM values. These values are then added to the PartialResult to produce a second partial product in step 412. Next, in step 413, the second partial product is stored in latch 308. In step 414, the values are added in adder 309 to produce the OldSum. Note, steps 407–413 may all occur in a second system cycle.

In step 415, OldSum is sign extended by 16 bits by the signextend operation. The lower 16 significant bits of the OldSum are stored in latch 311. Mux 310 will then be controlled by control logic 301 to select by line rsh16 in step 416 the signextended OldSum to produce the Partial Result. Line rsh16 performs a right shift by 16 bits of the sign extended OldSum.

Figure 4C:
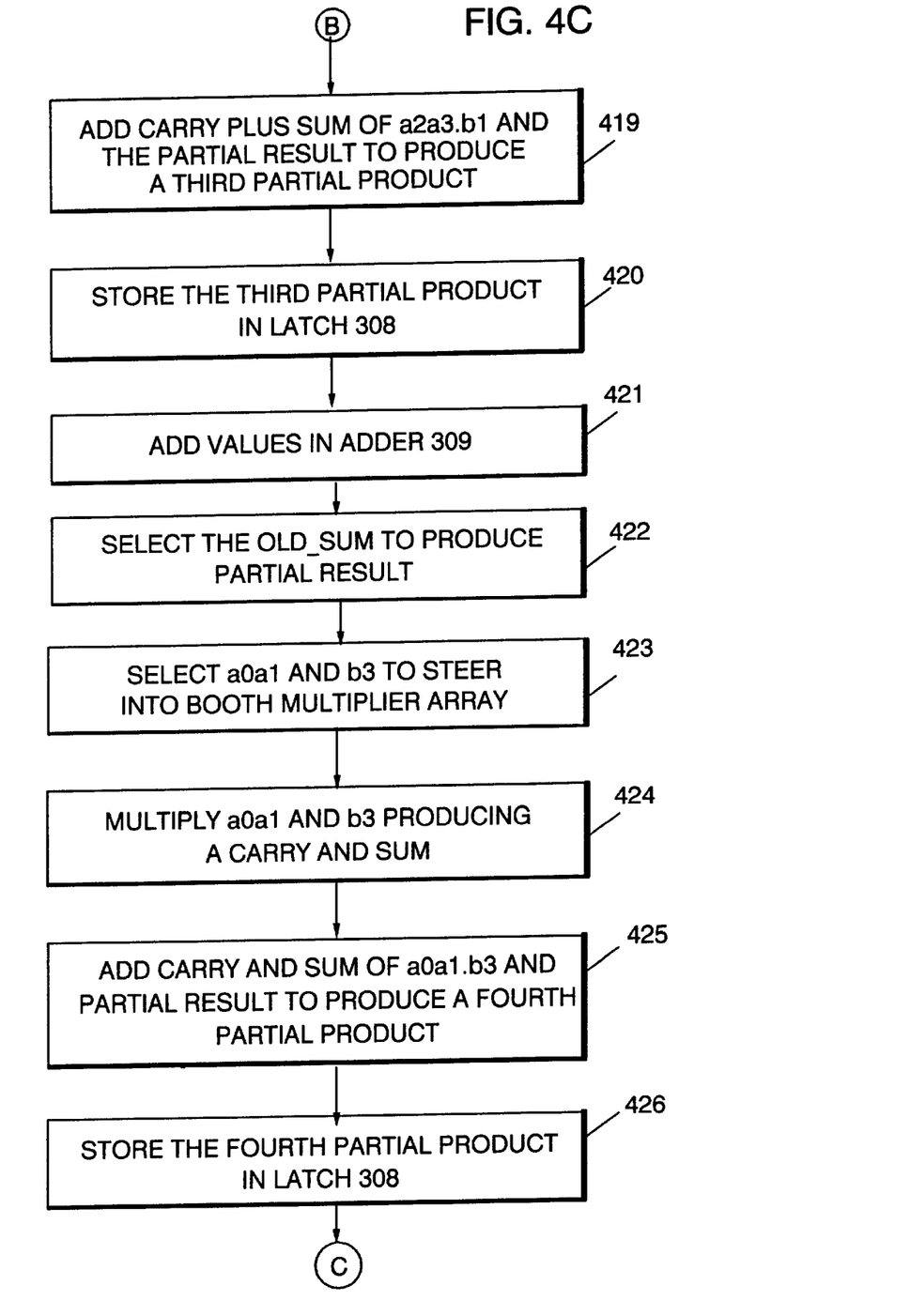

In step 417, values a2a3 and b1 are then selected to be steered into Booth multiplier array 306 to then be multiplied in step 418 to produce CARRY and SUM values. In step 419, a2a3.b1 is then summed with the PartialResult from mux 310 to produce a third partial product. In step 420, the third partial product is stored in latch 308. In step 421, these values are added in adder 309 to produce the OldSum. Note, steps 414–420 may all occur in a single system cycle.

Note by viewing FIG. 7 that this third partial product is to be added to the partial product a0a1.b3 without any shifting operations. Thus, in step 422, control logic 301 will signal FBACK mux 310 to select on line NoShift the OldSum without any concatenations or shifting to produce the Partial Result.

Figure 4D:
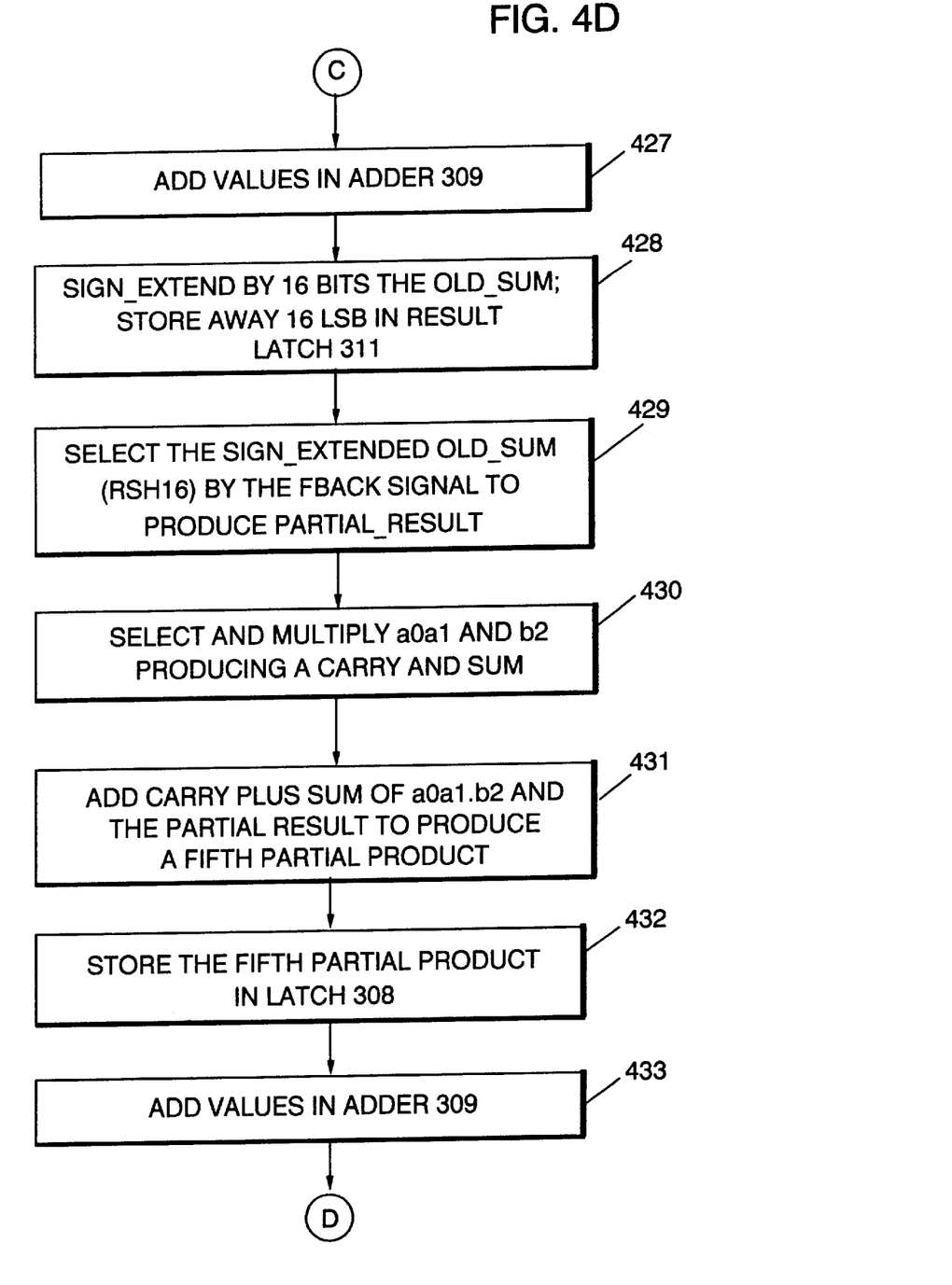

Next, in step 423, control logic 301 selects values a0a1 and b3 to steer into Booth multiplier array 306 for multiplication within step 424 to produce the CARRY and SUM values. These CARRY and SUM values are then summed with the previous PartialResult to produce a fourth partial product in step 425. In step 426, the fourth partial product is stored in latch 308, and in step 427, the values are added in adder 309. Note, steps 421–426 could be performed in one system cycle. In step 428, this OldSum is sign extended with 16 bits as described above through the signextend operation. The 16 LSB are stored in result latch 311. Control logic 301 will then choose by line rsh16 this signextended OldSum in step 429 in order to send the new PartialResult to CSA Tree 307.

Figure 4E:
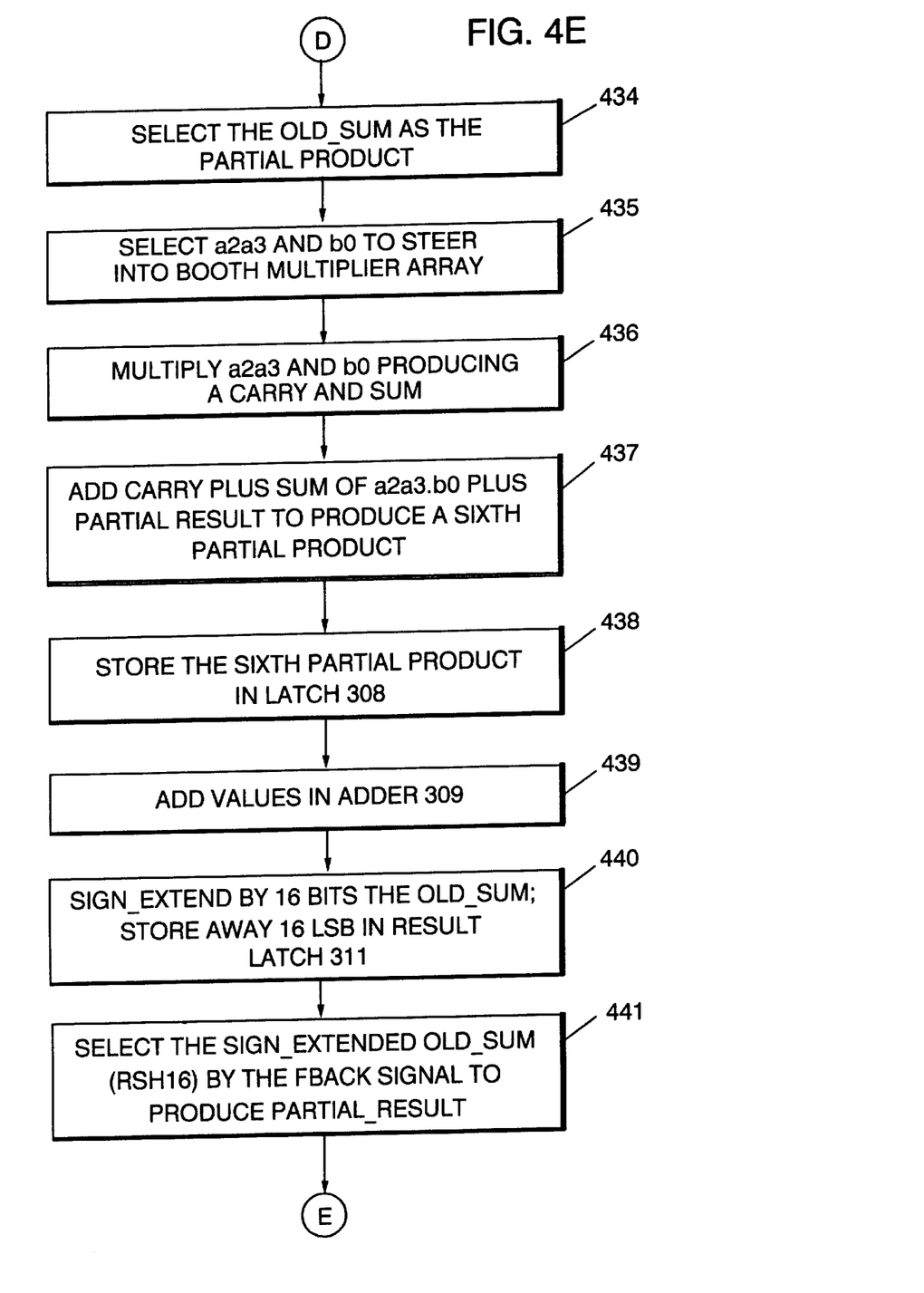

In step 430, control logic 301 selects values a0a1 and b2 and multiplies them to produce the CARRY and SUM values as before. In step 431, these CARRY and SUM values of a0a1.b2 are then added with the above PartialResult to produce a fifth partial product. In step 432, the fifth partial product is stored in latch 308. In step 433, the values are added in adder 309 to produce the OldSum. Note, steps 428–432 could occur in one system cycle.

Again note in FIG. 7 that this OldSum is not sign extended with 16 bits nor shifted, but is selected in step 434 by FBACK mux 310 through line NoShift "as is" in order to produce the PartialResult to send to CSA Tree 307.

Figure 4F:
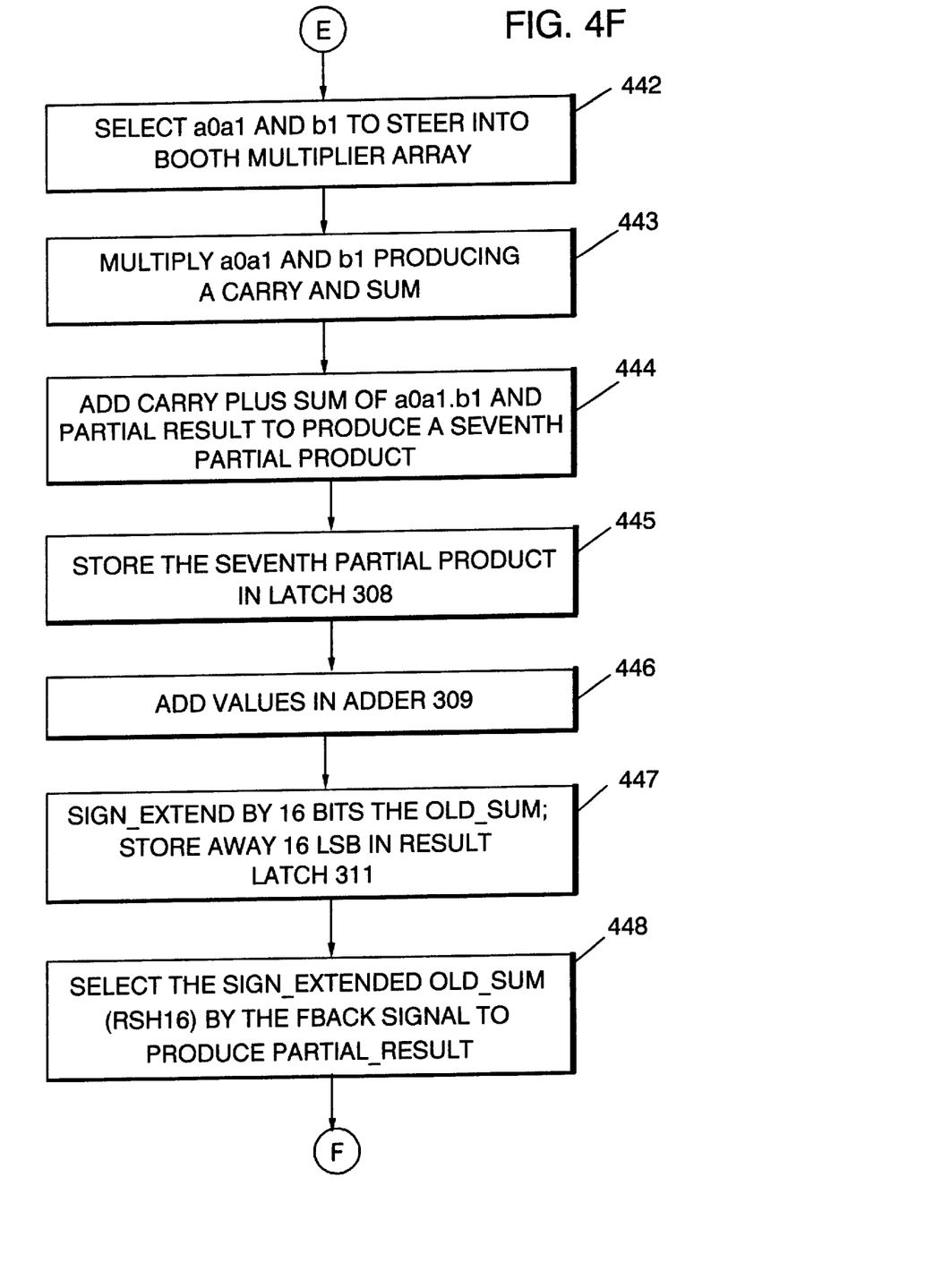

In step 435, control logic 301 selects values a2a3 and b3 to steer into Booth multiplier array 306. In step 436, these values are multiplied and the resultant CARRY and SUM values are then added to the PartialResult in step 437 to produce a sixth partial product. In step 438, the sixth partial product is stored in latch 308. These values are added in adder 309 to produce the OldSum. Note, steps 433–438 could occur in one system cycle. In step 440, this Old Sum is signextended as described above. The 16 LSB is stored away in result latch 311. In step 441, the sign extended OldSum is selected by line rsh16 by the FBACK signal to produce the PartialResult.

Figure 4G:
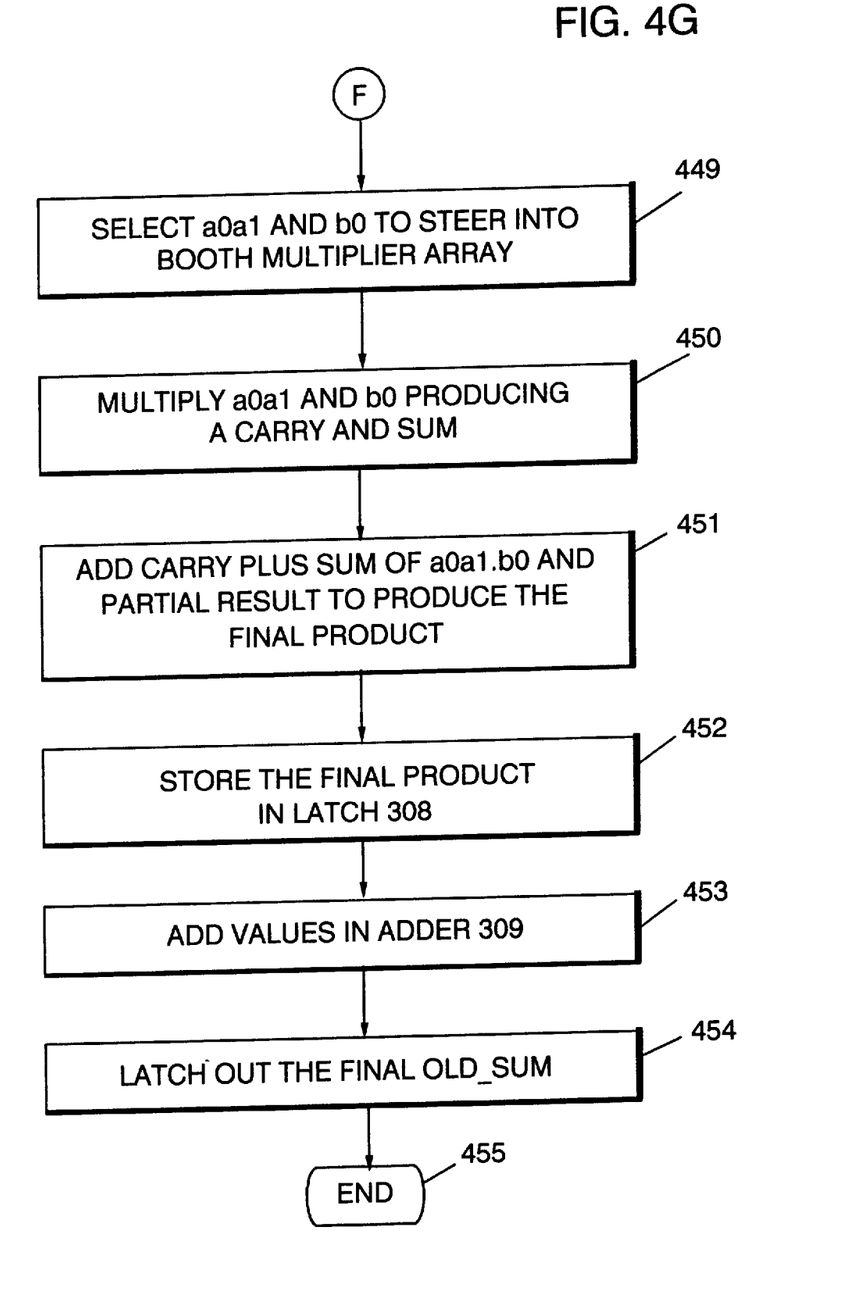

In step 442, values a0a1 and b1 are selected to be steered into Booth multiplier array 306. These values are multiplied in step 443 and then in step 444, the resultant CARRY and SUM values of a0a1.b1 are added to the PartialResult to produce a seventh partial product. In step 445, the seventh partial product is stored in latch 308. In step 446, the values are added in adder 309 to produce the OldSum. Note, steps 439–445 could occur in one system cycle. In step 447, this OldSum is then signextended as described above. The 16 LSB are stored in result latch 311 in step 447. In step 448, the signextended OldSum is selected by line rsh16 by the FBACK signal to produce the PartialResult. Lastly, values a0a1 and b0 are selected in step 449 to steer into Booth multiplier array 306. These values are multiplied in array 306 in step 450. The resultant CARRY and SUM values are then added with the PartialResult in step 451 to produce the final product. In step 452, the final product is stored in latch 308, and in step 453, the values are added in adder 309.

Lastly, in step 454, the final OldSum is latched out through result latch 311 for return to memory I/O 11. Latch 311 holds portion of results computed earlier. The process ends in step 455.

The unique selection order of the present invention is readily seen by comparing the diagrams of FIG. 6 and FIG. 7. As can be seen in FIG. 7, only shift right hardware is required since there is no need for shift left capabilities with respect to the partial products. This is performed by reordering the selections of the values to be multiplied as described above with respect to FIG. 4.

The result is that CSA Tree 307 is only required to be a 49-bit component, latch 308 is only required to be a 2×49-bit register and adder 309 is only required to be a 49-bit adder, as opposed to the 65-bit components illustrated in FIG. 2.

Although the present invention and its advantages have been described in detail, it should be understood that various changes, substitutions and alterations can be made herein without departing from the spirit and scope of the invention as defined by the appended claims.

What is claimed is:

1. A multiplier within a processor operable for multiplying two N-bit numbers (a0a1a2a3 and b0b1b2b3) in order to produce an N-bit×N-bit result, wherein a0a1a2a3 is divided into two M-bit numbers: a0a1 and a2a3, and wherein b0b1b2b3 is divided into four P-bit numbers: b0, b1, b2, b3, wherein said multiplier comprises:

means for multiplying a2a3 by b3 to produce a2a3.b3;

means for storing a lower X bits of said a2a3.b3;

means for sign extending Y bits to said a2a3.b3;

means for right shifting said sign extended a2a3.b3 to produce a first partial result;

means for multiplying a2a3 by b2 to produce a2a3.b2;

means for adding a2a3.b2 to said first partial result to produce a first result;

means for storing a lower X bits of said first result;

means for sign extending Y bits to said first result;

means for right shifting said sign extended first result to produce a second partial result;

means for multiplying a2a3 by b1 to produce a2a3.b1;

means for adding a2a3.b1 to said second partial result to produce a second result;

means for multiplying a0a1 by b3 to produce a0a1.b3;

means for adding a0a1.b3 to said second result to produce a third result;

means for storing a lower X bits of said third result;

means for sign extending Y bits to said third result;

means for right shifting said sign extended third result to produce a third partial result;

means for multiplying a0a1 by b2 to produce a0a1.b2;

means for adding a0a1.b2 to said third partial result to produce a fourth result;

means for multiplying a2a3 by b0 to produce a2a3.b0;

means for adding a2a3.b0 to said fourth result to produce a fifth result;

means for storing a lower X bits of said fifth result;

means for sign extending Y bits to said fifth result;

means for right shifting said sign extended fifth result to produce a fourth partial result;

means for multiplying a0a1 by b1 to produce a0a1.b1;

means for adding a0a1.b1 to said fourth partial result to produce a sixth result;

means for storing a lower X bits of said sixth result;

means for sign extending Y bits to said sixth result;

means for right shifting said sign extended sixth result to produce a fifth partial result;

means for multiplying a0a1 by b0 to produce a0a1.b0;

means for adding a0a1.b0 to said fifth partial result to produce a seventh result; and means for outputting said N-bit×N-bit result by concatenating an appropriate portion of said seventh result.

2. The multiplier as recited in claim 1, further comprising a means for receiving a0a1a2a3 and b0b1b2b3 from a memory I/O within said CPU.

3. The multiplier as recited in claim 2, wherein said outputting means comprises a means for sending said N-bit× N-bit result to said memory I/O.

4. The multiplier as recited in claim 1, wherein said multiplying means comprise a Booth multiplier array.

5. The multiplier as recited in claim 1, wherein said adding means comprise a 49-bit CSA tree, a 2×49-bit latch and a 49-bit adder.

6. A data processing system comprising a processor, a display device, a memory device, a storage device, an input device, and an output device coupled together by a system bus, said processor including a multiplier comprising:

means for multiplying a2a3 by b3 to produce a2a3.b3;

means for storing a lower X bits of said a2a3.b3;

means for sign extending Y bits to said a2a3.b3;

means for right shifting said sign extended a2a3.b3 to produce a first partial result;

means for multiplying a2a3 by b2 to produce a2a3.b2;

means for adding a2a3.b2 to said first partial result to produce a first result;

means for storing a lower X bits of said first result;

means for sign extending Y bits to said first result;

means for right shifting said sign extended first result to produce a second partial result;

means for multiplying a2a3 by b1 to produce a2a3.b1;

means for adding a2a3.b1 to said second partial result to produce a second result;

means for multiplying a0a1 by b3 to produce a0a1.b3;

means for adding a0a1.b3 to said second result to produce a third result;

means for storing a lower X bits of said third result;

means for sign extending Y bits to said third result;

means for right shifting said sign extended third result to produce a third partial result;

means for multiplying a0a1 by b2 to produce a0a1.b2;

means for adding a0a1.b2 to said third partial result to produce a fourth result;

means for multiplying a2a3 by b0 to produce a2a3.b0;

means for adding a2a3.b0 to said fourth result to produce a fifth result;

means for storing a lower X bits of said fifth result;

means for sign extending Y bits to said fifth result;

means for right shifting said sign extended fifth result to produce a fourth partial result;

means for multiplying a0a1 by b1 to produce a0a1.b1;

means for adding a0a1.b1 to said fourth partial result to produce a sixth result;

means for storing a lower X bits of said sixth result;

means for sign extending Y bits to said sixth result;

means for right shifting said sign extended sixth result to produce a fifth partial result;

means for multiplying a0a1 by b0 to produce a0a1.b0; and means for adding a0a1.b0 to said fifth partial result to produce a seventh result.

* * * * *